United States Patent
Barros

(10) Patent No.: US 10,652,382 B2
(45) Date of Patent: May 12, 2020

(54) SWITCHING TO A SINGLE RADIO CHAIN FOR VOICE COMMUNICATIONS

(71) Applicant: Google LLC, Mountain View, CA (US)

(72) Inventor: Daniel Jose Fernandes Barros, Redwood City, CA (US)

(73) Assignee: Google LLC, Mountain View, CA (US)

( * ) Notice: Subject to any disclaimer, the term of this patent is extended or adjusted under 35 U.S.C. 154(b) by 10 days.

(21) Appl. No.: 15/951,799

(22) Filed: Apr. 12, 2018

(65) Prior Publication Data

US 2019/0320055 A1    Oct. 17, 2019

(51) Int. Cl.
*H04M 1/725* (2006.01)
*H04W 74/00* (2009.01)
*H04W 92/20* (2009.01)

(52) U.S. Cl.
CPC ..... *H04M 1/72505* (2013.01); *H04W 74/006* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2011/0250926 A1* | 10/2011 | Wietfeldt | H01Q 1/243 455/525 |
| 2012/0013803 A1 | 1/2012 | Oren | |
| 2012/0099562 A1* | 4/2012 | Smadi | H04W 36/08 370/332 |
| 2012/0315905 A1* | 12/2012 | Zhu | H04W 36/36 455/436 |
| 2013/0242772 A1 | 9/2013 | Attar et al. | |
| 2014/0220916 A1 | 8/2014 | Mujtaba | |
| 2015/0282237 A1 | 10/2015 | Su | |
| 2016/0127028 A1 | 5/2016 | Wang et al. | |
| 2016/0212719 A1* | 7/2016 | Chakraborty | H04W 88/06 |
| 2017/0201998 A1* | 7/2017 | Akiyama | H04W 16/14 |

(Continued)

OTHER PUBLICATIONS

'gizmodo.com' [online] "New Wi-fi Chip is Just as Fast with Half the Antennae," Jamie Condliffe, Apr. 18, 2016, [retrieved on Apr. 12, 2018] Retrieved from Internet: URL< https://gizmodo.com/new-wifi-chip-is-just-as-fast-with-half-the-antennae-1771546729> 3 pages.

(Continued)

*Primary Examiner* — Noel R Beharry
*Assistant Examiner* — Rodrick Mak
(74) *Attorney, Agent, or Firm* — Fish & Richardson P.C.

(57) ABSTRACT

In general, the subject matter described in this disclosure can be embodied in methods, devices, and program products for selecting a wireless transmission mechanism. A computing device receives a request to begin a full-duplex voice communication session with a remote computing system. The computing device identifies that it has wirelessly connected to both a WWAN access point and a WLAN access point. The computing device determines whether a level of non-voice session data that is queued for transmission or receipt by the computing device falls beneath a threshold level of data, and as a result, switches to using a single one of multiple WLAN radio chains. The computing device communicates data over the single one of the multiple WLAN radio chains, including voice session data from the full-duplex voice communication session.

22 Claims, 6 Drawing Sheets

(56) References Cited

U.S. PATENT DOCUMENTS

2018/0049208 A1* 2/2018 Ozturk ............... H04W 28/085
2018/0124643 A1* 5/2018 Gupta ................ H04W 16/14
2019/0045461 A1* 2/2019 Fang ................. H04W 52/367

OTHER PUBLICATIONS

'www.technologyreview.com' [online] "Dual Antennas Would Boost Cell-Phone Signals," Tom Simonite, Aug. 12, 2010, [retrieved on Mar. 16, 2016] Retrieved from Internet: URL< https://www.technologyreview.com/s/420201/dual-antennas-would-boost-cell-phone-signals/> 5 pages.

* cited by examiner

SWITCHING TO A SINGLE RADIO CHAIN FOR VOICE COMMUNICATIONS

TECHNICAL FIELD

This document generally relates to switching to a single radio chain for voice communications.

BACKGROUND

Some computing devices can wirelessly communicate using multiple different wireless communication mechanisms. For example, a computing device may be able to communicate with either a Wireless Local Area Network (WLAN) or a Wireless Wide Area Network (WWAN). Communicating with either of these types of network types may involve sending and receiving data using an amplifier and an antenna that are designed specifically for that type of network. The combination of an amplifier and antenna, potentially with other physical hardware components, is sometimes called a radio chain. A computing device may include multiple radio chains for a particular network, for example, to enable the computing device to simultaneously communicate with the network using multiple different signals that have different respective frequencies.

SUMMARY

This document describes techniques, methods, systems, and other mechanisms for switching to a single radio chain for voice communications.

As additional description to the embodiments described below, the present disclosure describes the following embodiments.

Embodiment 1 is a computer-implemented for selecting a wireless transmission mechanism. The method comprises determining, by a computing device, that the computing device has received a request to begin a full-duplex voice communication session with a remote computing system, wherein the computing device includes a wireless wide area network (WWAN) radio chain arranged to communicate using WWAN technology and multiple wireless local area network (WLAN) radio chains arranged to communicate using WLAN technology. The method comprises identifying, by the computing device, that the computing device has wirelessly connected to both a WWAN access point that is communicating using the WWAN technology and a WLAN access point that is communicating using the WLAN technology. The method comprises determining, by the computing device in response to having identified that the computing device has wirelessly connected to both the WWAN access point and the WLAN access point and having determined that the computing device has received the request to begin the full-duplex voice communication session, whether a level of non-voice session data that is queued for transmission or receipt by the computing device falls beneath a threshold level of data. The method comprises switching, by the computing device as a result of the computing device having determined that the level of non-voice session data that is queued for transmission or receipt by the computing device falls beneath the threshold level of data, to using a single one of the multiple WLAN radio chains, and communicating data over the single one of the multiple WLAN radio chains, including voice session data from the full-duplex voice communication session, in distinction to communicating data over more than one of the multiple WLAN radio chains.

Embodiment 2 is the method of embodiment 1, wherein the computing device had been communicating data over more than one of the multiple WLAN radio chains immediately prior to the computing device switching to using the single one of the multiple WLAN radio chains.

Embodiment 3 is the method of embodiment 1 or 2, wherein the computing device is configured to communicate data over the WWAN radio chain, including the voice session data from the full-duplex voice communication session, as a result of the computing device having determined that the level of non-voice session data that is queued for transmission or receipt by the computing device does not fall beneath the threshold level of data.

Embodiment 4 is the method of any one of embodiments 1 through 3, further comprising: determining, by the computing device and while the computing device is communicating data over the single one of the multiple WLAN radio chains, that a quality of WLAN communications drops below a threshold quality level; and switching, by the computing device as a result of the computing device having determined that the quality of WLAN communications dropped below the threshold quality level, from using the single one of the multiple WLAN radio chains to using the WWAN radio chain, and communicating data over the WLAN radio chain, including voice session data from the full-duplex voice communication session.

Embodiment 5 is the method of any one of embodiments 1 through 4, further comprising: determining, by the computing device and while the computing device is communicating data over the single one of the multiple WLAN radio chains, that the level of non-voice session data that is queued for transmission or receipt by the computing device is greater than a second threshold level of data, wherein the second threshold level of data is greater than the first threshold level of data; and switching, by the computing device as a result of the computing device having determined that the level of non-voice session data that is queued for transmission or receipt by the computing device is greater than the second threshold level of data, from using the single one of the multiple WLAN radio chains to using the WWAN radio chain, and communicating data over the WWAN radio chain, including voice session data from the full-duplex voice communication session.

Embodiment 6 is the method of any one of embodiments 1 through 5, wherein the computing device communicating data over the single one of the multiple WLAN radio chains, including the voice session data from the full-duplex voice communication session, is further in distinction to the computing device communicating data over the WWAN radio chain, such that data is being transmitted over only the single one of the multiple WLAN radio chains.

Embodiment 7 is the method of any one of embodiments 1 through 6, wherein: the single one of the multiple WLAN radio chains includes a first amplifier and a first antenna; a second one of the multiple WLAN radio chains includes a second amplifier and a second antenna; the WWAN radio chain includes a third amplifier and a third antenna; and the first antenna, the second antenna, and the third antenna are physically separated from each another.

Embodiment 8 is the method of any one of embodiments 1 through 7, wherein: the WLAN technology comprises Wi-Fi technology; and the WWAN technology comprises cellular technology that uses one or more of Global System for Mobiles (GSM), Code Division Multiple Access (CDMA), or Long-Term Evolution (LTE).

Embodiment 9 is the method of any one of embodiments 1 through 8, wherein: communications using one or more of the WLAN radio chains communicate using center channel frequencies between 2 GHz and 30 GHz; and communications using the WWAN radio chain communicate using center channel frequencies between 300 MHz and 2000 MHz.

Embodiment 10 is the method of any one of embodiments 1 through 9, wherein the level of non-voice session data that is queued for transmission or receipt comprises a trend level at which non-voice session data that is queued for transmission or receipt is increasing or decreasing.

Embodiment 11 is directed to a computing device, comprising: a wireless wide area network (WWAN) radio chain arranged to communicate using wireless WWAN technology; multiple wireless local area network (WLAN) radio chains arranged to communicate using WLAN technology; one or more processors; and one or more computer-readable devices including instructions that, when executed by the one or more processors, cause performance of operations according to the method of any one of embodiments 1 through 10.

Particular implementations can, in certain instances, realize one or more of the following advantages. A computing device that switches to a single WLAN radio chain for voice communications may use less power and therefore less battery capacity than if the computing device communicated using multiple WLAN radio chains or one or more WWAN radio chains. As such, the techniques described in this disclosure may not only enable a computing device to use less battery capacity, but may enable a computing device to decrease an amount of usage of a WWAN network. Reducing WWAN usage can benefit not only a user of the computing device (e.g., by saving a data allowance for other communications), but can also increase data throughput for other users of the WWAN network.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
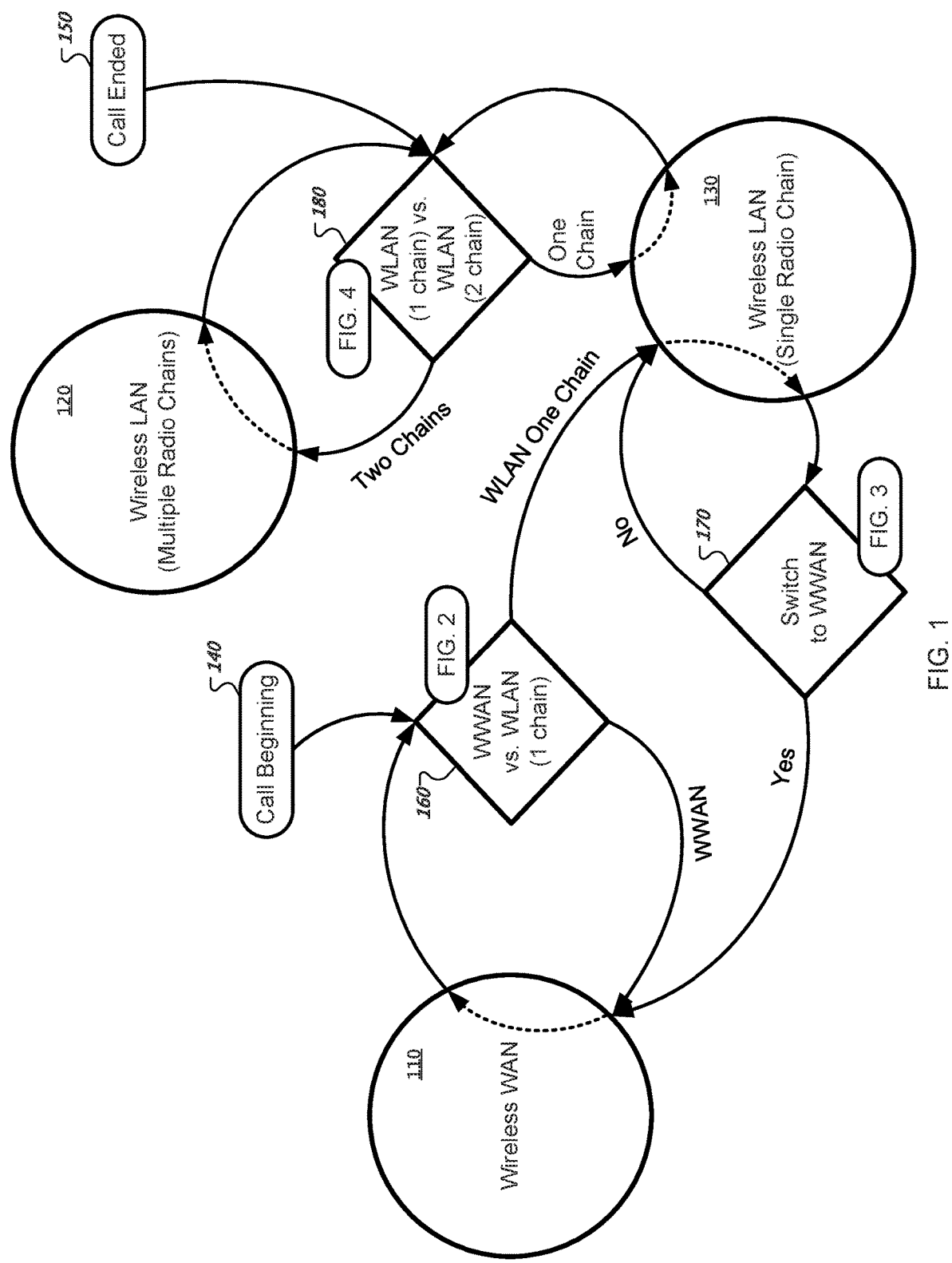
FIG. 1 shows a state diagram that illustrates a computing device switching between different wireless communication modes.

This document generally describes determining whether to use a single radio chain for voice communications.

Some computing devices include hardware that enables communications over multiple different types of wireless networks, such as a WWAN (e.g., an LTE network of distributed base stations provided by a telecommunications company) and a WLAN (e.g., a network of one or more Wi-Fi routers at a coffee shop).

Protocols for some types of WLAN technologies may be designed to support, and may even default to, simultaneously using multiple frequency bands for communications between a computing device and an access point. Using multiple frequencies at the same time can increase data throughput, but can also increase power consumption. For example, a computing device that is wirelessly transmitting a large file may be able to transmit the file faster, and potentially even with less power consumption, using WLAN technology than WWAN technology.

The benefits of WLAN technology, however, may not be as evident when a user of a computing device is participating in a voice communication session (e.g., a telephone call or video conference in which at least two individuals are speaking to each other in real time using at least two respective computing devices). This is because much of the power consumed by a computing device during a voice communication session is due to WLAN hardware components waiting in an "ON" state to receive voice data packets. This extended amount of waiting may occur because at least some WLAN protocols do not schedule data transmissions ahead of time and therefore may have to wait for the sending device to identify a moment during which no other devices on the WLAN are transmitting and to transmit at that moment. A computing device engaged in a voice communication session may use less power and therefore less battery consumption if that computing device is connected to a WWAN rather than a WLAN that is using multiple radio chains.

Still, there are benefits to computing device using a WLAN rather than a WWAN. For example, it can be beneficial to limit the amount of data communicated over a WWAN because users sometimes pay to use a WWAN network, either based on an amount of data communicated, or based on a subscription model in which the user is allocated a particular amount of data or a particular number of communication minutes per month. And even if the user has a purportedly unlimited data plan, a WWAN network provider may throttle (i.e., slow) communications if a user communicates too much data over a given time period. Further, using WWAN network resources rather than those of an available WLAN network may limit the speed or amount of data that other users in the same geographical region can communicate using the WWAN network.

At least some of the above-described disadvantages can be avoided by using a single WLAN radio chain in certain circumstances. A single WLAN radio chain may not provide a same level of throughput as using one or more WWAN radio chains in some configurations, but a single WLAN radio chain may consume less power, even if waiting in an "ON" state for data transmissions, relative to a WWAN. Moreover, a single WLAN radio chain may provide sufficient data throughput to support a full duplex voice communication session (e.g., a voice communication session in which both users can speak at the same time). Accordingly, a mechanism that switches a computing device to a single WLAN radio chain when the computing device is participating in or about to participate in a voice communication session may save battery usage and WWAN data usage, at least with respect to alternative mechanisms in which two or more WLAN radio chains are used or a WWAN is used.

FIG. 1 shows a state diagram that illustrates a computing device switching between different wireless communication modes. The modes include a WWAN mode 110, a WLAN (multiple radio chains) mode 120, and a WLAN (single radio chain) mode 130. A computing device that is operating in the WLAN (single radio chain) mode 130 uses a single WLAN radio chain to communicate with a WLAN access point. While in the WLAN (single radio chain) mode 130, the computing device may not use a second WLAN radio chain and may not use a WWAN radio chain to wirelessly communicate at a same time (e.g., within a 1, 10, 50, 100, or 1000 ms time window of having communicated in mode 130).

The state diagram of FIG. 1 illustrates various modes in which the computing device may wirelessly communicate with remote devices accessible through the internet when a WWAN and a WLAN are both available to provide such connectivity. In other words, the computing device may have recently performed any necessary handshaking and authentication procedures to establish communication capabilities with both types of networks, and therefore may be able to select one of the networks for its communications. This is in contrast to situations in which the computing device is unable to communicate with both a WWAN and a WLAN, for example, because signals for one of the network types is either too weak or the computing device has not provided sufficient authentication credentials for one of the networks.

When a voice communication session is not active, the computing device may default to communicating over the WLAN both to save WWAN resources and because WLAN communications may be relatively power efficient in many different scenarios. For example, data communications that occur in bursts may consume less battery power when performed over a WLAN than over a WWAN. In some implementations, the computing device will always use multiple WLAN radio chains when a WLAN network is available and the computing device is not engaged in a voice communication session.

Still, in some implementations, a computing device that is not engaged in a voice communication session may select to communicate using a single WLAN radio chain (mode 130) rather than multiple WLAN radio chains (mode 120). After a call has ended (at state 150), or before a call has begun, for example, the selection between these different modes may be performed by determination 180 (described in additional detail with respect to FIG. 4). This determination may involve the computing device deciding to use the single WLAN radio chain only when certain circumstances are present, for example, when the amount of data queued for communications falls below a threshold, or when the amount of data queued for communication falls below the threshold and the data is queued for communication with at least a threshold number of devices, such that the computing device will need to be listening much of the time. The computing device may otherwise default to using multiple WLAN radio chains. In some implementations (not illustrated in FIG. 1), the computing device may communicate over the WWAN when a voice communication is not ongoing, even though a WLAN is available. In some implementations, the computing device may only communicate over a single WLAN radio chain (mode 130) when a voice communication is ongoing, and therefore may never communicate over a single WLAN radio chain (mode 130) when a voice communication is not ongoing.

Figure 2:
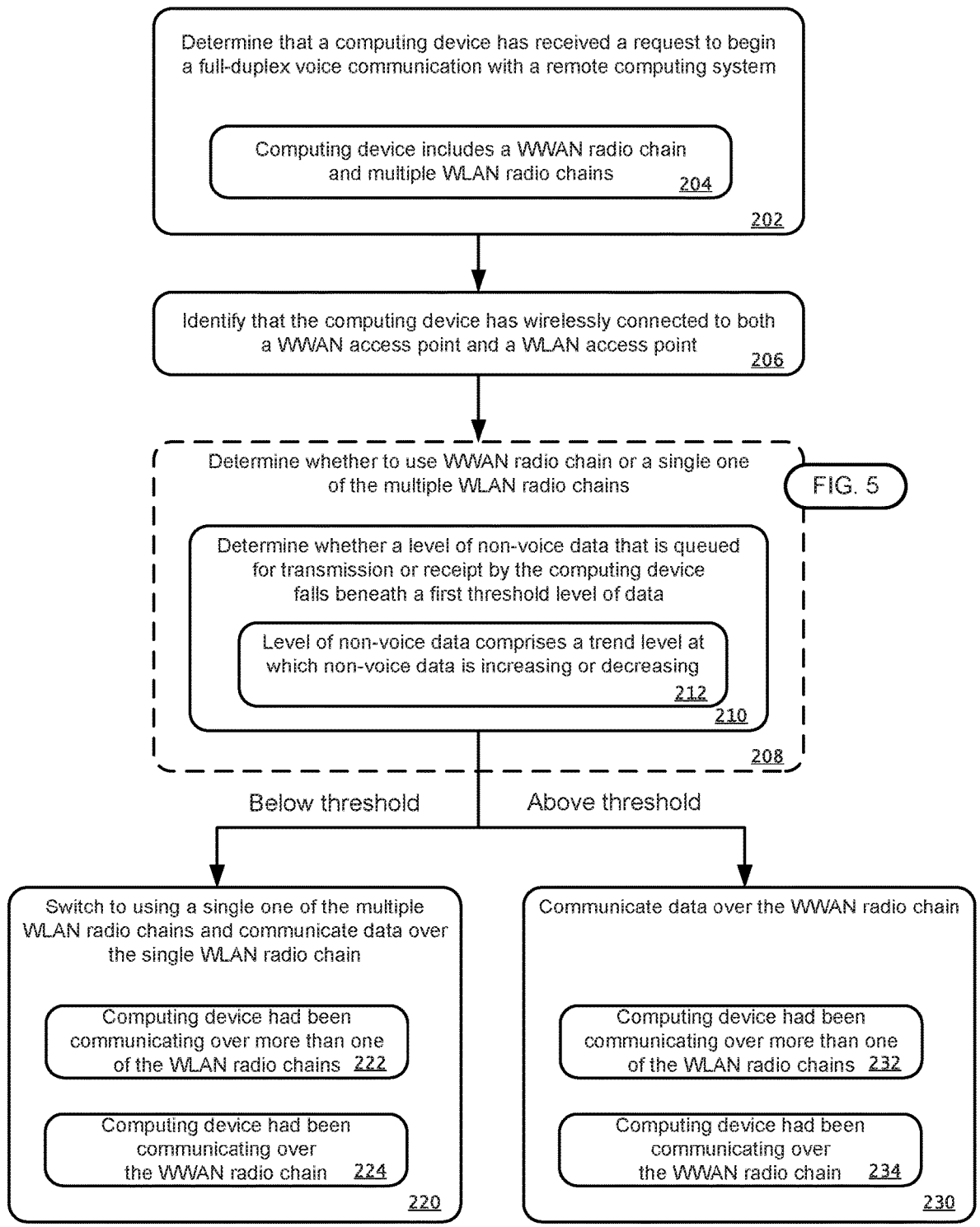
FIG. 2 shows a flowchart of a process for determining whether to communicate using a WWAN radio chain or a single WLAN radio chain.

Upon a computing device determining that voice communication (e.g., a call) is beginning (at state 140), the computing device may perform determination 160 (described in additional detail with respect to FIG. 2). The determination 160 may include deciding whether the computing device should communicate with the WWAN (mode 110) or with a single radio chain of the WLAN (mode 130), and can involve weighing multiple different factors. One of these factors, for example, can be whether a level of non-voice data that is queued for communication by the computing device falls beneath a threshold level of data.

A small queue of data queued for communication may indicate that much or all of the wireless communication will involve data pertaining to the voice communication session data, and therefore that a single WLAN radio chain can provide the necessary bandwidth. Should a larger queue of data be present, the computing device may select to communicate over the WWAN (using a single radio chain or multiple radio chains), because the WWAN may provide a greater amount of bandwidth to handle the greater amount of data queued for communication, although potentially at a greater cost in power consumption.

The analysis of the level of non-voice session data that is queued for communication can involve an analysis of an amount of data queued for communication, or an analysis of data that is derived from such information, such as a trend level that indicates whether data queued for communication has been increasing or decreasing. The non-voice data that is analyzed may be exclusively data that does not belong to any voice communication session, or may involve non-voice data mixed in with voice communication data. In other words, the analysis of the level of non-voice session data that is queued for communication can be of a queue of all data that is queued for communication, even if some of that data includes voice communication session data. The level of data that is not from a voice session may be zero in certain instances in which no other application on the computing device is communicating with a remote device connected to the internet.

A computing device may perform the determination 160 as a result of a call beginning while the computing device is in any of modes 110, 120, or 130. In some implementations, the determination 160 is first performed once the computing device has already begun a telephone call, with data for the telephone call initially being routed to the computing device using, for example, multiple radio chains of the WLAN (see mode 120).

As illustrated in FIG. 1, a computing device that is communicating over a WWAN may regularly perform the determination 160 regarding whether to continue to use the WWAN or whether to switch to a single WLAN radio chain. Should the computing device select to communicate using a single WLAN radio chain (mode 130), the computing device may thereafter perform a different determination 170 (described in additional detail with respect to FIG. 3) regarding whether to continue using the single WLAN radio chain (mode 130) or whether to switch to the WWAN (mode 110).

This determination 170 may involve the computing device determining to switch from the single WLAN radio chain (mode 130) to the WWAN (mode 110) if certain criteria are satisfied. A first example criteria can include the level of non-voice data that is queued for communication being greater than a second threshold level of data, where the second threshold level of data may be higher than the threshold level used in determination 160. In other words, the computing device may determine to switch from the WWAN to using a single WLAN radio chain if the data queued for communication falls beneath a certain level, but the data queue rising back above that certain level may not cause the computing device to switch back to the WWAN. Rather, the data queued for communication may need to rise to a larger amount, for example, to prevent repeated switching between the WWAN and the single WLAN radio chain.

A second example criteria is the quality of the WLAN communication dropping below a threshold quality level. The threshold quality level may be based on one or more of a level of latency, a power level of received communications, a bit error level, or a packet error level, for example. Regardless, the determination 160 for switching from the WWAN (mode 110) to the single WLAN radio chain (mode 130) may be different than the determination 170 for switching from the single WLAN radio chain (mode 130) to the WWAN (mode 110).

In some implementations, either or both of the determinations 160 and 170 may be overridden based on user input. For example, a device user can interact with a configuration interface of the computing device to specify that communications session data (e.g., voice data and non-voice data) are to be transmitted and received using either the WWAN (mode 110) or the WLAN. If the device user were to specify that communications session data are to be transmitted and received using the WLAN, for example, the computing device can perform a determination 180 for transmitting and receiving communications session data over the WLAN using either a single radio chain (mode 130) or multiple radio chains (120).

Figure 3:
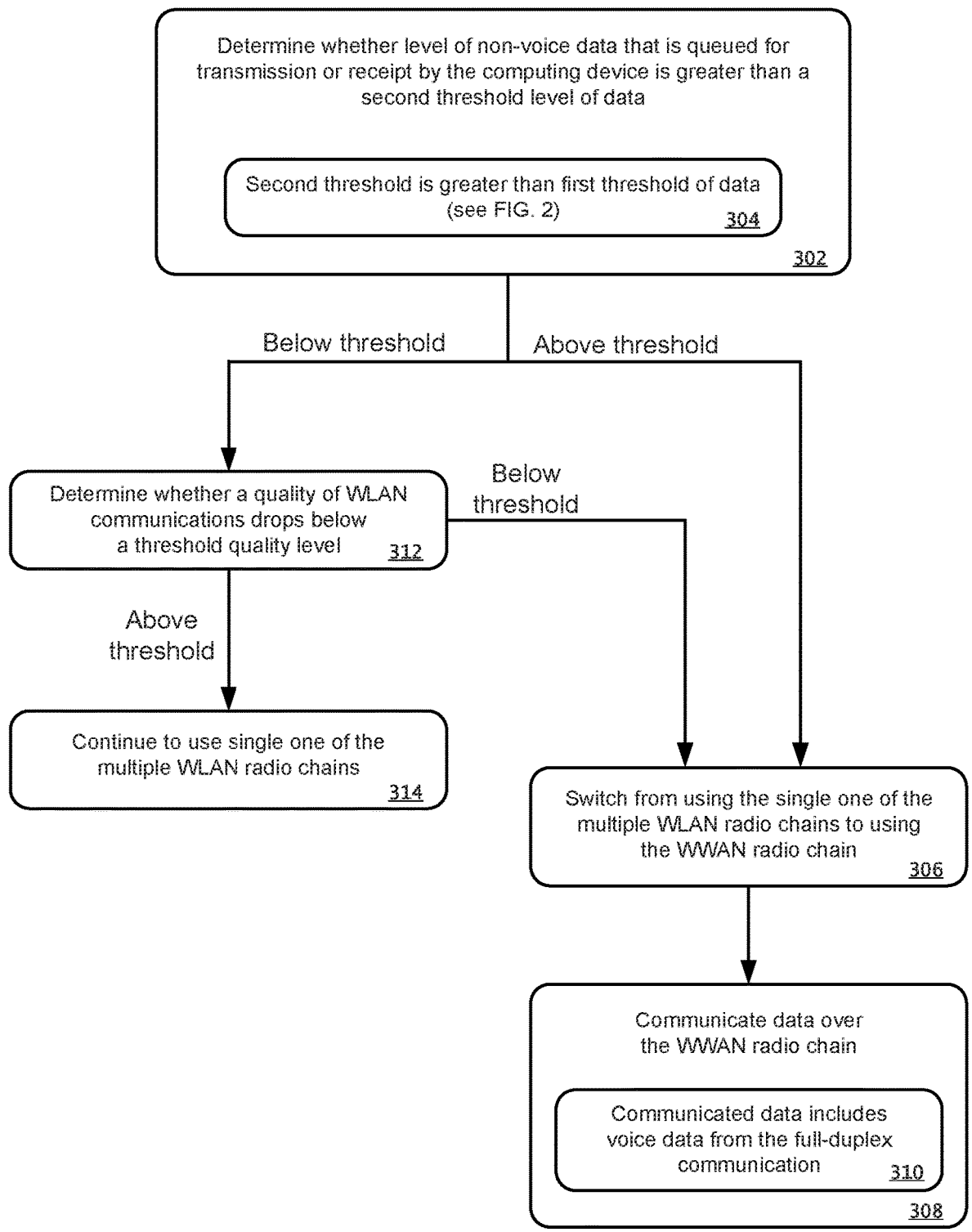
FIG. 3 shows a flowchart of a process for determining whether to switch from communicating using a single WLAN radio chain to using a WWAN radio chain.
Figure 4:
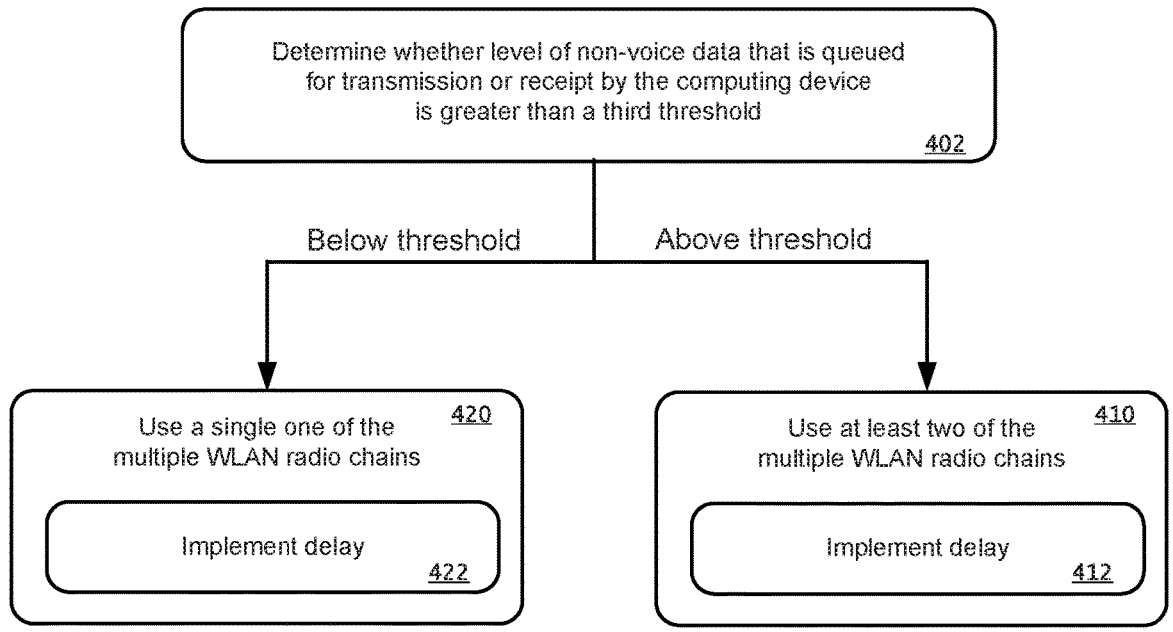
FIG. 4 shows a flowchart of a process for determining whether to communicate using a single WLAN radio chain or at least two WLAN radio chains.

Before describing the determinations 160, 170, and 180 in additional detail with respect to FIGS. 2, 3, and 4, respectively, this disclosure will discuss some of the differences between an example WLAN and an example WWAN. An example WLAN includes a Wi-Fi network, and such a network may include a first radio chain transmitting with a center frequency at approximately 2.4 GHz and a second radio chain transmitting with a center frequency at approximately 5.8 GHz, and at distances less than 1000 feet. In contrast, an example WWAN may transmit using one or more radio chains having respective center frequencies between 500 and 2000 MHz, at distances of over a mile.

The example WLAN may be present at a particular venue, such as a home or business, and is sometimes free to use. A user may have to enter credentials (e.g., a username and password) to use the WLAN. A user may only be able to communicate with the WLAN while near the venue, and the WLAN may not include multiple access points geographically distributed across multiple cities or multiple states. In contrast, the example WWAN may require a user to pay a monthly fee, and may provide that user a certain data allowance per month. The example WWAN may have base stations that are geographically distributed over multiple cities or states, and may be configured to handle handoffs from one base station to the next as a user travels by car without a drop in coverage. A user may not have to enter a username and credentials to access the WWAN, but the device with which the user is connecting may need to have a SIM card that is authenticated by the WWAN.

The WLAN may communicate using a shared medium, by which there is no central scheduler that controls which device on the network communicates at which time. Rather, each device may rely on collision avoidance, where each sending device attempts to avoid collisions by transmitting only when the sending device senses the channel to be idle. This is in contrast to an example WWAN, in which a device may be transmitted a schedule that identifies a portion of time within a repeating unit of time (e.g., a slot or a frame) during which the device is permitted to transmit or receive data.

FIG. 2 shows a flowchart of an example process for determining whether to communicate using a WWAN radio chain or a single WLAN radio chain. In general, the process can be performed by a computing device upon determining that a voice communication session (e.g., a phone call, a video conference, or another sort of voice communication session) is beginning or is in progress. The process described with respect to FIG. 2 can involve the computing device performing the determination 160 (FIG. 1) of whether the computing device should communicate with the WWAN (mode 110) or with a single radio chain of the WLAN (mode 130).

At box 202, a computing device determines that it has received a request to begin a full-duplex voice communication session with a remote computing system. Referring again to FIG. 1, for example, the computing device can determine at state 140 that a voice communication session (e.g., a phone call, a video conference, or another sort of voice communication session) has begun, either as a result of a device user having initiated the session (e.g., having placed the phone call or launched the video conference), or as a result of an incoming request from the remote computing system to initiate the session (e.g., having received a phone call or video conference invitation or initiation request). The remote computing system, for example, can include a computing system of a mobile network operator or another provider of wireless communications services. As another example, the remote computing system can include a computing system that hosts communication sessions between two or more computing devices connected through the internet.

At box 204, the computing device may include a wireless wide area network (WWAN) radio chain arranged to communicate using WWAN technology and multiple wireless local area network (WLAN) radio chains arranged to communicate using WLAN technology. For example, the computing device can be a mobile computing device, such as a smartphone, cellular telephone, personal digital assistant, tablet computing device, or another appropriate type of mobile computing device. The computing device can be configured to communicate (e.g., to send and receive data) over the WWAN using the WWAN radio chain, or over the WLAN using one or more of the WLAN radio chains. The WLAN technology can include Wi-Fi technology. For example, the computing device can identify wireless access points that are in range of the device, to connect to one of the wireless access points, and to communicate with other computing devices over the WLAN using one or more of the WLAN radio chains. The WWAN technology can include cellular technology that uses one or more of Global System for Mobiles (GSM), Code Division Multiple Access (CDMA), or Long-Term Evolution (LTE). For example, the computing device can connect to a base station of the WWAN and communicate with other computing devices over the WWAN using one or more of the cellular technologies.

Each of the multiple WLAN radio chains and the WWAN radio chain can include a respective amplifier and antenna. For example, a first one of the multiple WLAN radio chains can include a first amplifier and a first antenna, and a second one of the multiple WLAN radio chains can include a second amplifier and a second antenna. The WWAN radio chain, for example, can include a third amplifier and a third antenna. In the present example, the first antenna, the second antenna, and the third antenna are physically separated from each another. In general, communications using one or more of the WLAN radio chains can include using center channel frequencies between 2 GHz and 30 GHz. In general, communications using the WWAN radio chain can include using center channel frequencies between 300 MHz and 2000 MHz.

At box 206, the computing device identifies that it has wirelessly connected to both a WWAN access point that is communicating using the WWAN technology and a WLAN access point that is communicating using the WLAN technology. In general, the computing device can identify wireless connections by periodically determining whether it is in range of a suitable WWAN access point and is in range of a suitable WLAN access point. For example, the computing device can periodically (e.g., once a minute, once every five minutes, once every ten minutes, or another suitable time interval) scan a list of base stations sent by the WWAN to determine which of the base stations is in optimal communication range, and the computing device can receive broadcast signals from various nearby WiFi access points of various WLANs. In the present example, the computing device may be in a location (e.g., a coffee shop) where it has connected to both the WWAN (e.g., through a base station of the WWAN that is within the WWAN communication range of the computing device) and the WLAN (e.g., through a Wi-Fi access point that is within the computing device's WLAN communication range).

At box 208, the computing device determines, in response to having identified that it has wirelessly connected to both the WWAN access point and the WLAN access point, and having determined that it has received the request to begin the full-duplex voice communication session, whether to use the WWAN radio chain or a single one of the WLAN radio chains. Referring to FIG. 1, for example, the computing device can perform the determination 160 of whether to use the WWAN radio chain (mode 110) or a single one of the WLAN radio chains (mode 130). In general, determining whether to use the WWAN radio chain or a single one of the WLAN radio chains may be based on one or more of various criteria, including levels of non-voice session data, signal quality of communications, amount of network congestion, and latency of communications with networks.

At box 210, determining whether to use the WWAN radio chain or a single one of the WLAN radio chains may include determining whether a level of non-voice session data that is queued for transmission or receipt by the computing device falls beneath a first threshold level of data. For example, the computing device may be sending and/or receiving non-voice session data (e.g., downloading an application, sending a file, streaming audio and/or video content, etc.) when voice communication begins (state 140, shown in FIG. 1).

The level of non-voice session data may include one or more of an amount of data that is queued for transmission or receipt by the computing device and a rate at which the data is being transmitted and/or received. In the present example, the computing device may be downloading data (e.g., one or more files) when voice communication begins. Before downloading the data, for example, the computing device may have received information that indicates an amount of data (e.g., a size of the one or more files) to be downloaded. While downloading the data, for example, the computing device can track an amount of data that is yet to be received and a rate at which the data is being received. If data is being uploaded by the computing device (e.g., one or more files are being transmitted), for example, the computing device can track an amount of data that is yet to be transmitted and a rate at which the data is being transmitted. In some implementations, the computing device may track a total level of non-voice session data which includes an amount of data that is queued for transmission and an amount of data that is queued for receipt. In some implementations, the computing device may separately track levels of non-voice session data that are queued for transmission and that are queued for receipt.

At box 212, the level of non-voice session data that is queued for transmission or receipt may include a trend level at which non-voice session data that is queued for transmission or receipt is increasing or decreasing. For example, the computing device can, at periodic time intervals (e.g., 10 ms, 100 ms, 1000 ms, or another suitable time interval), track levels of queued non-voice session data, and store values corresponding to the levels in memory. The computing device can then compare prior levels of queued non-voice session data over a sliding window (e.g., the previous second, the previous five seconds, the previous ten seconds, or another suitable value), to determine the trend level at which queued non-voice session data has been increasing or decreasing.

Figure 5:
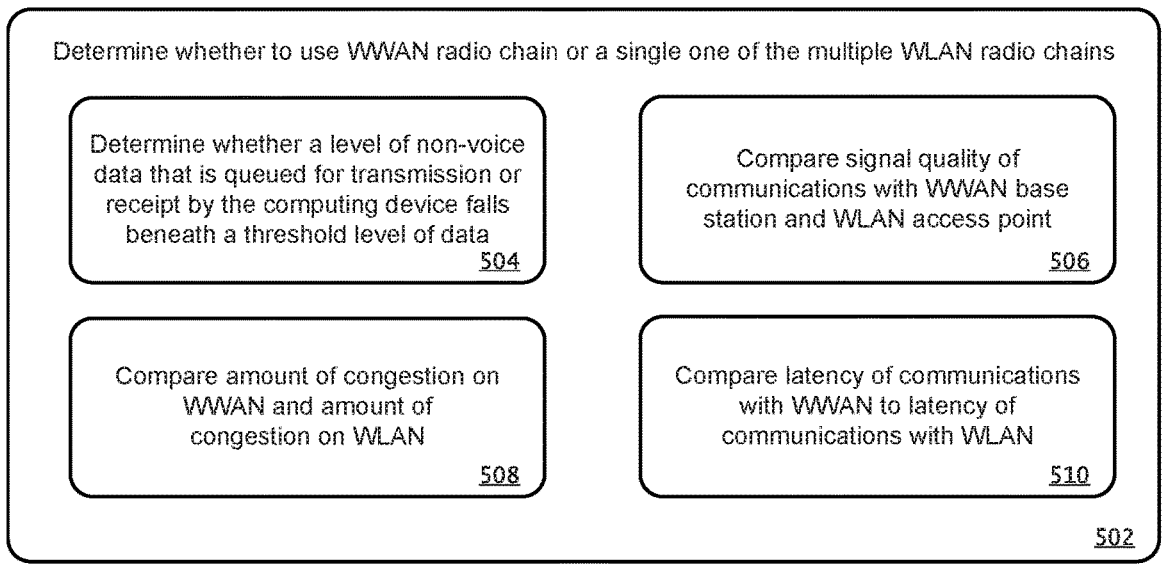
FIG. 5 shows various different mechanisms for determining whether to use a WWAN radio chain or a single WLAN radio chain.

Other criteria that may be used instead of, or in combination with determining whether the level of non-voice session data that is queued for transmission or receipt by the computing device falls beneath a first threshold level of data may include signal quality of communications, amount of network congestion, and latency of communications with networks, and are described in additional detail with respect to FIG. 5.

At box 220, the computing device switches to using a single one of the multiple WLAN radio chains, and communicates data over the single one of the multiple WLAN radio chains. Communicating data over the single one of the multiple WLAN radio chains, including voice session data from the full-duplex voice communication session, may be in distinction to data being communicated over more than one of the multiple WLAN radio chains, and may be in distinction to data being communicated over the WWAN radio chain, such that data is being transmitted over only the single one of the multiple WLAN radio chains, at least within a defined period of time (e.g., 5 ms, 50 ms, 100 ms, 1 second, 5 seconds, 30 seconds, 1 minute).

Referring again to FIG. 1, for example, the computing device switches to the WLAN and uses a single radio chain (mode 130). The switching may be as a result of the computing device having determined that the level of non-voice session data that is queued for transmission or receipt by the computing device falls beneath the first threshold level of data. If the computing device determines that the level of queued non-voice session data (e.g., for transmission and/or receipt) falls beneath the first threshold level of data (e.g., including one or more of (i) an amount of data, (ii) a data transfer rate, and (iii) a trend level which indicates queued data changes), for example, the computing device switches to using a single one of the multiple WLAN radio chains. For example, the computing device may determine that, relative to the first threshold, a relatively small amount of data (or no data) is queued for transmission and/or receipt. As another example, the computing device may determine that, relative to the first threshold, a relatively low data transfer rate is occurring (or no non-voice session data is being transferred). As another example, the computing device may determine that, relative to the first threshold, a trend level at which non-voice session data that is queued for transmission and/or receipt is not increasing or is decreasing.

At box 222, the computing device had been communicating data over more than one of the multiple WLAN radio chains immediately prior to the computing device switching to using the single one of the multiple WLAN radio chains. For example, the computing device may have been using two or more WLAN radio chains (e.g., the device had been in mode 120, shown in FIG. 1) to transmit and/or receive data immediately prior to state 140 (also shown in FIG. 1).

At box 224, the computing device had been communicating data over the WWAN radio chain immediately prior to the computing device switching to using the single one of the multiple WLAN radio chains. For example, the computing device may have been using the WWAN radio chain (e.g., the device had been in mode 110, shown in FIG. 1) to transmit and/or receive data immediately prior to state 140 (also shown in FIG. 1).

At box 230, the computing device communicates data over the WWAN radio chain, including the voice session data from the full-duplex voice communication session. Referring again to FIG. 1, for example, the computing device communicates data over the WWAN (mode 110). Communicating the data over the WWAN radio chain may be a result of the computing device having determined that the level of non-voice session data that is queued for transmission or receipt by the computing device does not fall beneath the first threshold level of data. If the computing device determines that the level of queued non-voice session data (e.g., for transmission and/or receipt) does not fall beneath the first threshold level of data (e.g., including one or more of (i) an amount of data, (ii) a data transfer rate, and (iii) a trend level which indicates queued data changes), for example, the computing device uses the WWAN radio chain. For example, the computing device may determine that, relative to the first threshold, a relatively large amount of data is queued for transmission and/or receipt. As another example, the computing device may determine that, relative to the first threshold, a relatively high data transfer rate is occurring. As another example, the computing device may determine that, relative to the first threshold, a trend level at which non-voice session data that is queued for transmission and/or receipt is increasing.

At box 232, the computing device had been communicating data over more than one of the multiple WLAN radio chains immediately prior to the computing device communicating data over the WWAN radio chain. For example, the computing device may have been using two or more WLAN radio chains (e.g., the device had been in mode 120, shown in FIG. 1) to transmit and/or receive data immediately prior to state 140 (also shown in FIG. 1).

At box 234, the computing device may continue communicating data over the WWAN radio chain. For example, the computing device may have been using the WWAN radio chain (e.g., the device had been in mode 110, shown in FIG. 1) to transmit and/or receive data immediately prior to state 140 (also shown in FIG. 1).

FIG. 3 shows a flowchart of an example process for determining whether to switch from communicating using a single WLAN radio chain to using a WWAN radio chain. In general, the process can be performed by a computing device during a voice communication session (e.g., a phone call, a video conference, or another sort of voice communication session). Referring to FIG. 1, for example, the computing device can perform the determination 170 of whether to switch from the single WLAN radio chain (mode 130) to the WWAN (mode 110). In general, determining whether switch from the single WLAN radio chain to the WWAN may be based on one or more of various criteria, including levels of non-voice session data, signal quality of communications, amount of network congestion, and latency of communications with networks.

At box 302, a computing device determines, while the computing device is communicating data over the single one of the multiple WLAN radio chains, whether the level of non-voice session data that is queued for transmission or receipt by the computing device is greater than a second threshold level of data. For example, the computing device can communicate over a WLAN using the single WLAN radio chain, including transmitting and receiving data associated with a full-duplex voice communication session with a remote computing system, and possibly transmitting and receiving non-voice session data. While the device is participating in the full-duplex communication session over the WLAN using the single WLAN radio chain, for example, the computing device may track a level of non-voice session data that is also being communicated, including an amount of data that is queued for transmission and an amount of data that is queued for receipt.

At box 304, the second threshold level of data may be greater than the first threshold level of data. As with the first threshold level of data, the second threshold level of data may include one or more of an amount of non-voice session data that is queued for transmission or receipt by the computing device, a rate at which the data is being transmitted and/or received, and a trend level at which non-voice session data that is queued for transmission or receipt is increasing or decreasing. However, the second threshold level of data may configured to be greater than the first threshold level of data, for example, to prevent repeated switching between the WWAN and the single WLAN radio chain, saving battery usage.

Other criteria that may be used instead of, or in combination with determining whether the level of non-voice session data that is queued for transmission or receipt by the computing device falls beneath a second threshold level of data may include signal quality of communications, amount of network congestion, and latency of communications with networks, and are described in additional detail with respect to FIG. 5.

At box 306, the computing device switches from using the single one of the multiple WLAN radio chains to using the WWAN radio chain. Referring again to FIG. 1, for example, the computing device switches from the WLAN, using a single radio chain (mode 130), to the WWAN (mode 110). The switching may be a result of the computing device having determined that the level of non-voice session data that is queued for transmission or receipt by the computing device is greater than the second threshold level of data. If the computing device determines that the level of queued non-voice session data (e.g., for transmission and/or receipt) is above the second threshold level of data (e.g., including one or more of (i) an amount of data, (ii) a data transfer rate, and (iii) a trend level which indicates queued data changes), for example, the computing device switches to using the WWAN radio chain. For example, the computing device may determine that, relative to the second threshold, a relatively large amount of data is queued for transmission and/or receipt. As another example, the computing device may determine that, relative to the second threshold, a relatively high data transfer rate is occurring. As another example, the computing device may determine that, relative to the second threshold, a trend level at which non-voice session data that is queued for transmission and/or receipt is increasing.

At box 308, the computing device communicates data over the WWAN radio chain. For example, the computing device can communicate non-voice session data over the WWAN radio chain, including transmitting and/or receiving data over the WWAN. At box 310, the communicated data may include voice session data from the full-duplex voice communication session. For example, in addition to communicating the non-voice session data, the computing device can communicate the voice session data over the WWAN radio chain.

At box 312, after determining that the level of non-voice session data that is queued for transmission or receipt by the computing device is below the second threshold level of data (or as an alternative to performing the determination of box 302), the computing device determines, while the computing device is communicating data over the single one of the multiple WLAN radio chains, whether a quality of WLAN communications drops below a threshold quality level. Determining whether a quality of WLAN communications drops below the threshold quality level, for example, can include one or more of determining whether a signal quality of communications with the WLAN, an amount of network congestion on the WLAN, and/or that a latency of communication the WLAN drops below respective threshold values, described in additional detail with respect to FIG. 5.

At box 306, the computing device switches from using the single one of the multiple WLAN radio chains to using the WWAN radio chain, as a result of having determined that the quality of WLAN communications dropped below the threshold quality level. Referring again to FIG. 1, for example, the computing device switches from the WLAN, using a single radio chain (mode 130), to the WWAN (mode 110). The computing device then proceeds to communicate data over the WWAN radio chain (box 308) and no longer communicates data using the WLAN.

At box 314, the computing device continues to use the single one of the multiple WLAN radio chains, as a result of having determined that the quality of WLAN communications is above the threshold quality level. For example, the computing device can continue communicating over the WLAN (mode 130, shown in FIG. 1), and can periodically (e.g., once per second, once every five seconds, once every ten seconds, or another suitable time interval) perform the determination of whether the level of non-voice data that is queued for transmission or receipt by the computing device is greater than the second threshold level of data (box 302).

FIG. 4 shows a flowchart of an example process for determining whether to communicate using a single WLAN radio chain or at least two WLAN radio chains. In general, the process can be performed by a computing device while the device is not engaged in a voice communication session (e.g., a phone call, a video conference, or another sort of voice communication session). Referring to FIG. 1, for example, the computing device can perform the determination 180 of whether to communicate using a single WLAN radio chain (mode 130) rather than multiple WLAN radio chains (mode 120).

At box 402, the computing device determines whether a level of non-voice data that is queued for transmission or receipt by the computing device is greater than a third threshold level of data. The third threshold level of data, for example, may be different than either or both of the first threshold level of data (described with respect to box 210, shown in FIG. 2) and the second threshold level of data (described with respect to box 302, shown in FIG. 3). For example, the third threshold level of data may be below the first threshold level of data, between the first and second threshold levels of data, or above the second threshold level of data.

At box 410, the computing device uses at least two of the multiple WLAN radio chains. Referring again to FIG. 1, for example, the computing device communicates over the WLAN, using multiple radio chains (e.g., the device enters or remains in mode 120), as a result of the computing device having determined that the level of non-voice data that is queued for transmission or receipt by the computing device is above the third threshold level of data (e.g., including one or more of (i) an amount of data, (ii) a data transfer rate, and (iii) a trend level which indicates queued data changes). For example, the computing device may determine that, relative to the third threshold, a relatively large amount of data is queued for transmission and/or receipt. As another example, the computing device may determine that, relative to the third threshold, a relatively high data transfer rate is occurring. As another example, the computing device may determine that, relative to the third threshold, a trend level at which data that is queued for transmission and/or receipt is increasing.

At box 412, the computing device implements a delay. For example, the computing device can delay performing another determination of whether the level of non-voice data that is queued for transmission or receipt by the computing device is greater than the third threshold level of data, until a suitable amount of time has elapsed (e.g., a second, five seconds, ten seconds, or another suitable amount of time).

At box 420, the computing device uses a single one of the multiple WLAN radio chains. Referring again to FIG. 1, for example, the computing device communicates over the WLAN, using a single radio chain (e.g., the device enters or remains in mode 130), as a result of the computing device having determined that the level of non-voice data that is queued for transmission or receipt by the computing device is below the third threshold of data (e.g., including one or more of (i) an amount of data, (ii) a data transfer rate, and (iii) a trend level which indicates queued data changes). For example, the computing device may determine that, relative to the third threshold, a relatively small amount of data (or no data) is queued for transmission and/or receipt. As another example, the computing device may determine that, relative to the third threshold, a relatively low data transfer rate is occurring (or no data is being transferred). As another example, the computing device may determine that, relative to the third threshold, a trend level at which data that is queued for transmission and/or receipt is decreasing.

At box 422, the computing device implements a delay. For example, the computing device can delay performing another determination of whether the level of non-voice data that is queued for transmission or receipt by the computing device is greater than the third threshold level of data, until a suitable amount of time has elapsed (e.g., a second, five seconds, ten seconds, or another suitable amount of time).

FIG. 5 shows various different example mechanisms for determining whether to use a WWAN radio chain or a single WLAN radio chain. Referring to FIG. 1, for example, the different example mechanisms can be used by the computing device when performing the determination 160 and/or the determination 170 of whether to communicate over the WWAN (mode 110) or the WLAN, using the single radio chain (mode 130).

At box 502, the computing device determines whether to use a WWAN radio chain or a single one of the multiple WLAN radio chains. Determining whether to use the WWAN radio chain or a single one of the multiple WLAN radio chains, for example, can include evaluating one or more factors described with respect to boxes 504, 506, 508, and 510. In some implementations, two or more of the factors may be evaluated and weighed (e.g., using a scoring mechanism), such that at least one of the factors may be assigned a higher weight than other factors when determining a quality of communications and/or whether to use the WWAN radio chain or a single one of the multiple WLAN radio chains. In some implementations, evaluation of two or more factors may be performed in a predefined order, such that determining whether to use the WWAN radio chain or a single one of the multiple WLAN radio chains is reflected in a decision tree or another suitable decision structure. In some implementations, one or more of the factors may be associated with threshold values.

At box 504, determining whether to use the WWAN radio chain or the single one of the multiple WLAN radio chains includes determining whether a level of non-voice data that is queued for transmission or receipt by the computing device falls beneath a threshold level of data. For example, the level of queued non-voice session data (e.g., for transmission and/or receipt) can include one or more of (i) an amount of data, (ii) a data transfer rate, and (iii) a trend level which indicates queued data changes. Determining whether the level of queued non-voice session data falls beneath the threshold level of data is described in additional detail with respect to box 210 (shown in FIG. 2) and box 302 (shown in FIG. 3).

At box 506, determining whether to use the WWAN radio chain or the single one of the multiple WLAN radio chains includes comparing a signal quality of communications with a WWAN base station and a signal quality of communications with a WLAN access point. The signal quality of communications with the WWAN base station, for example, may be indicated by a signal strength of the base station, a packet error rate for data being communicated over the WWAN, or another suitable signal quality metric. The signal quality of communications with the WLAN access point, for example, may be indicated by a signal strength of the access point, a packet error rate for data being communicated over the WLAN, or another suitable signal quality metric.

At box 508, determining whether to use the WWAN radio chain or the single one of the multiple WLAN radio chains includes comparing an amount of congestion on a WWAN with an amount of congestion on a WLAN. The amount of congestion on the WWAN may be communicated to the computing device by a WWAN base station, for example, and may be indicated by a number of computing devices communicating with the WWAN base station, a percentage of available bandwidth from the WWAN base station, or another suitable congestion metric. The amount of congestion on the WLAN may be communicated to the computing device by a WLAN access point, for example, and may be indicated by a number of computing devices communicating with the WLAN access point, a percentage of available bandwidth from the WLAN access point, or another suitable congestion metric. As another example, the amount of congestion on the WLAN may be inferred by the computing device by determining a percentage of time which the WLAN access point is available for communication.

At box 510, determining whether to use the WWAN radio chain or the single one of the multiple WLAN radio chains includes comparing a latency of communications with a WWAN to a latency of communications with a WLAN. Communications latency, for example, may be expressed as an amount of time for a data packet (e.g., a test data packet) to be provided to or from the computing device across a network. The latency of communications with the WWAN, for example, may be indicated by an amount of time to send and/or receive the data packet over the WWAN. The latency of communication with the WLAN, for example, may be indicated by an amount of time to send and/or receive the data packet over the WWAN.

Figure 6:
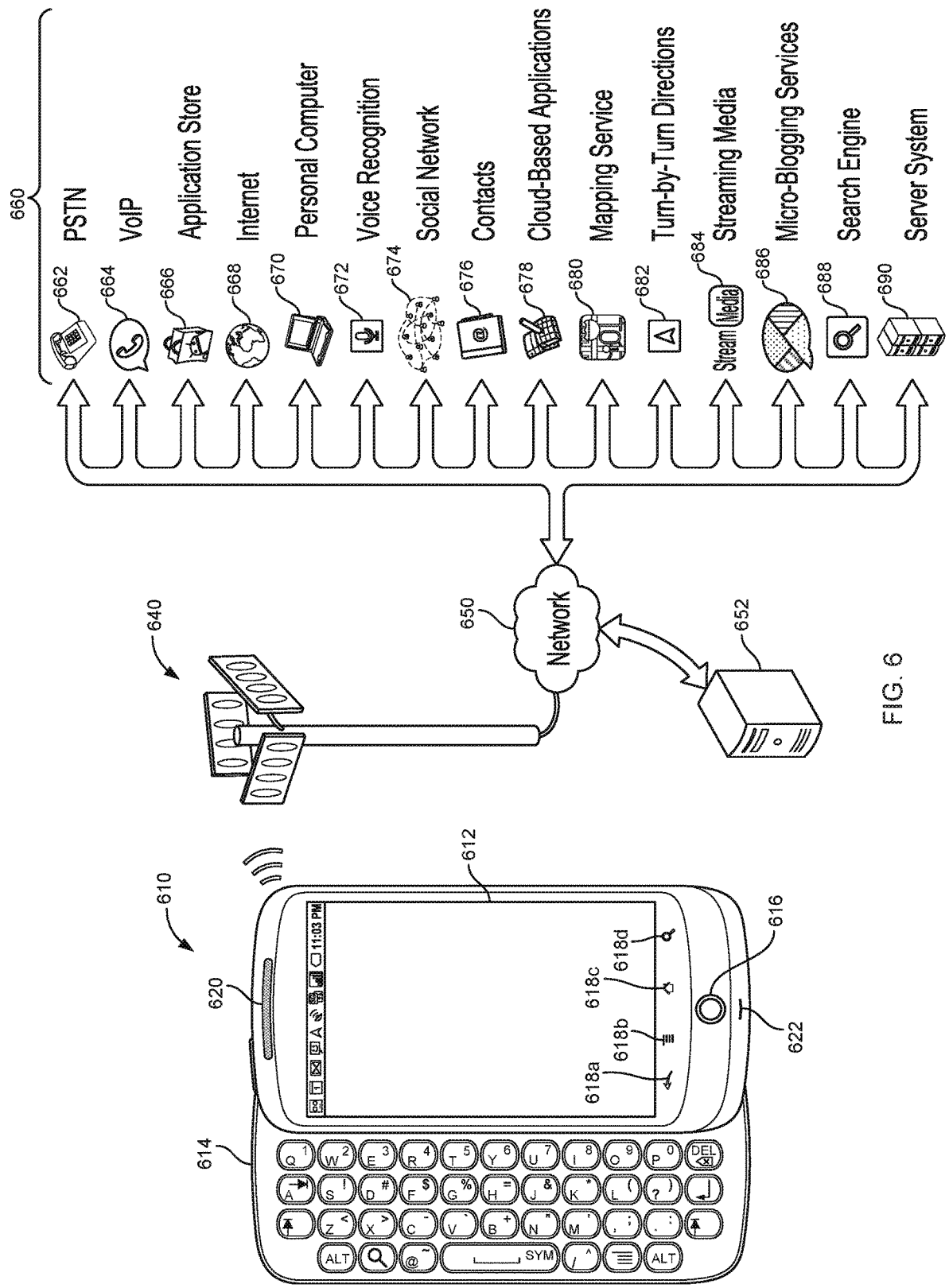
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" graphical user interface that is displayed after turning on the mobile computing device 610, after activating the mobile computing device 610 from a sleep state, after "unlocking" the mobile computing device 610, or after receiving user-selection of the "home" button 618c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 610 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 610 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., ETHERNET, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computing systems that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing systems associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call using a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 7:
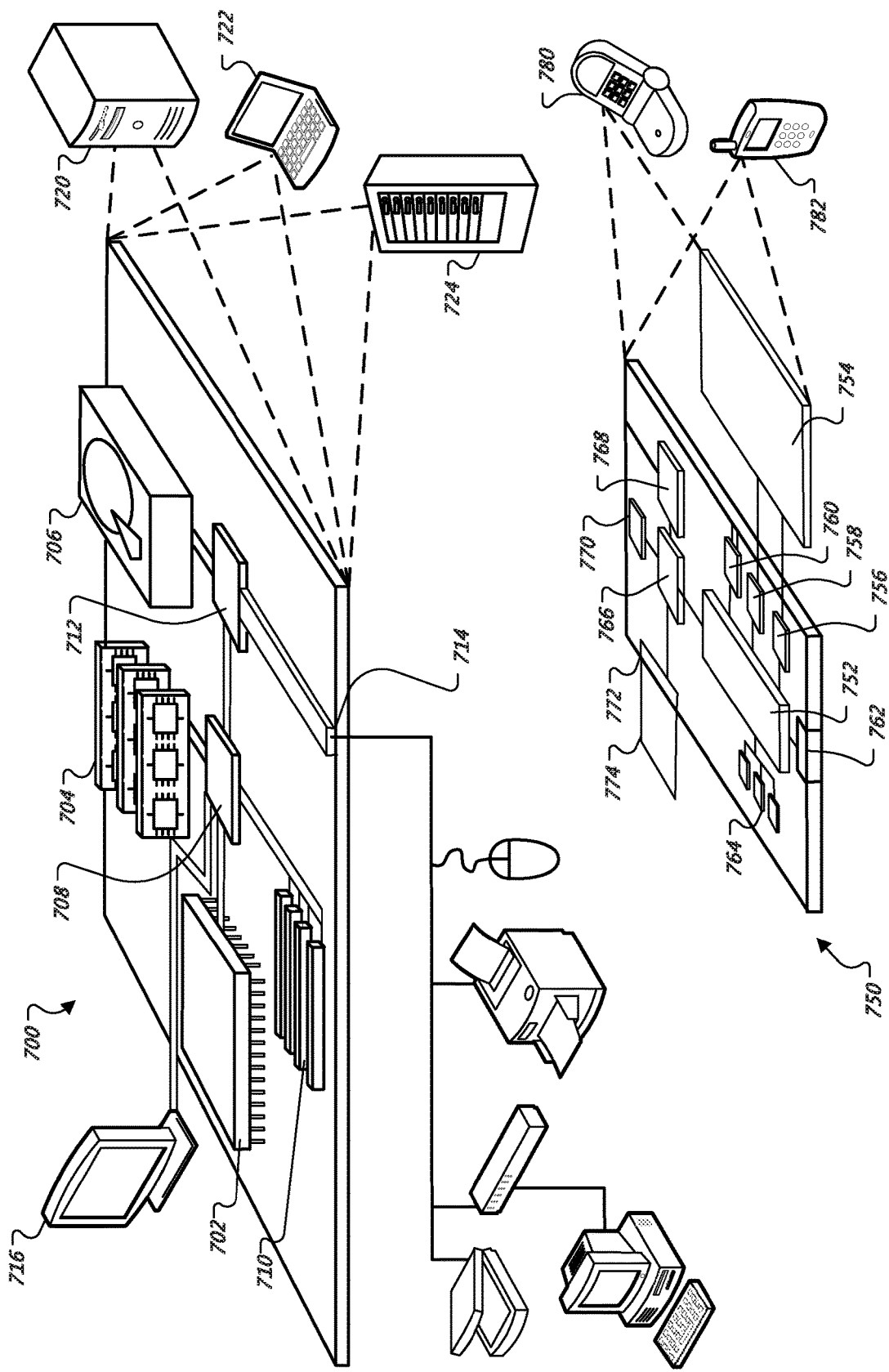
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provided, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for selecting a wireless transmission mechanism, comprising:
  determining, by a computing device, that the computing device has received a request to begin a full-duplex voice communication session with a remote computing system, wherein the computing device includes a wireless wide area network (WWAN) radio chain arranged to communicate using WWAN technology and multiple wireless local area network (WLAN) radio chains arranged to communicate using WLAN technology;
  identifying, by the computing device, that the computing device has wirelessly connected to both a WWAN access point that is communicating using the WWAN technology and a WLAN access point that is communicating using the WLAN technology;
  determining, by the computing device in response to having identified that the computing device has wirelessly connected to both the WWAN access point and the WLAN access point and having determined that the computing device has received the request to begin the full-duplex voice communication session, whether a level of non-voice session data that is queued for transmission or receipt by the computing device falls beneath a threshold level of data; and
  switching, by the computing device as a result of the computing device having determined that the level of non-voice session data that is queued for transmission or receipt by the computing device falls beneath the threshold level of data, to using a single one of the multiple WLAN radio chains, and communicating data over the single one of the multiple WLAN radio chains, including voice session data from the full-duplex voice communication session, in distinction to communicating data over more than one of the multiple WLAN radio chains, wherein communicating data over the single one of the multiple WLAN radio chains includes transmitting and receiving the voice session data, and transmitting or receiving the non-voice session data.

2. The computer-implemented method of claim 1, wherein the computing device had been communicating data over more than one of the multiple WLAN radio chains immediately prior to the computing device switching to using the single one of the multiple WLAN radio chains.

3. The computer-implemented method of claim 1, wherein the computing device is configured to communicate data over the WWAN radio chain, including the voice session data from the full-duplex voice communication session, as a result of the computing device having determined that the level of non-voice session data that is queued for transmission or receipt by the computing device does not fall beneath the threshold level of data.

4. The computer-implemented method of claim 1, further comprising: determining, by the computing device and while the computing device is communicating data over the single one of the multiple WLAN radio chains, that a quality of WLAN communications drops below a threshold quality level; and
  switching, by the computing device as a result of the computing device having determined that the quality of WLAN communications dropped below the threshold quality level, from using the single one of the multiple WLAN radio chains to using the WWAN radio chain, and communicating data over the WWAN radio chain, including voice session data from the full-duplex voice communication session.

5. The computer-implemented method of claim 1, further comprising:
  determining, by the computing device and while the computing device is communicating data over the single one of the multiple WLAN radio chains, that the level of non-voice session data that is queued for transmission or receipt by the computing device is greater than a second threshold level of data, wherein the second threshold level of data is greater than the first threshold level of data; and
  switching, by the computing device as a result of the computing device having determined that the level of non-voice session data that is queued for transmission or receipt by the computing device is greater than the second threshold level of data, from using the single one of the multiple WLAN radio chains to using the WWAN radio chain, and communicating data over the WWAN radio chain, including voice session data from the full-duplex voice communication session.

6. The computer-implemented method of claim 1, wherein the computing device communicating data over the single one of the multiple WLAN radio chains, including the voice session data from the full-duplex voice communication session, is further in distinction to the computing device communicating data over the WWAN radio chain, such that data is being transmitted over only the single one of the multiple WLAN radio chains.

7. The computer-implemented method of claim 1, wherein:
  the single one of the multiple WLAN radio chains includes a first amplifier and a first antenna;
  a second one of the multiple WLAN radio chains includes a second amplifier and a second antenna;
  the WWAN radio chain includes a third amplifier and a third antenna; and the first antenna, the second antenna, and the third antenna are physically separated from each another.

8. The computer-implemented method of claim 1, wherein:
  the WLAN technology comprises Wi-Fi technology; and
  the WWAN technology comprises cellular technology that uses one or more of Global System for Mobiles (GSM), Code Division Multiple Access (CDMA), or Long-Term Evolution (LTE).

9. The computer-implemented method of claim 1, wherein:
  communications using one or more of the WLAN radio chains communicate using center channel frequencies between 2 GHz and 30 GHz; and
  communications using the WWAN radio chain communicate using center channel frequencies between 300 MHz and 2000 MHz.

10. The computer-implemented method of claim 1, wherein the level of non-voice session data that is queued for transmission or receipt comprises a trend level at which non-voice session data that is queued for transmission or receipt is increasing or decreasing.

11. A computing device, comprising:
  a wireless wide area network (WWAN) radio chain arranged to communicate using wireless WWAN technology;

multiple wireless local area network (WLAN) radio chains arranged to communicate using WLAN technology;

one or more processors; and one or more computer-readable devices including instructions that, when executed by the one or more processors, cause performance of operations that include:

determining, by the computing device, that the computing device has received a request to begin a full-duplex voice communication session with a remote computing system;

identifying, by the computing device, that the computing device has wirelessly connected to both a WWAN access point that is communicating using the WWAN technology and a WLAN access point that is communicating using the WLAN technology;

determining, by the computing device in response to having identified that the computing device has wirelessly connected to both the WWAN access point and the WLAN access point and having determined that the computing device has received the request to begin the full-duplex voice communication session, whether a level of non-voice session data that is queued for transmission or receipt by the computing device falls beneath a threshold level of data; and switching, by the computing device as a result of the computing device having determined that the level of non-voice session data that is queued for transmission or receipt by the computing device falls beneath the threshold level of data, to using a single one of the multiple WLAN radio chains, and communicating data over the single one of the multiple WLAN radio chains, including voice session data from the full-duplex voice communication session, in distinction to communicating data over more than one of the multiple WLAN radio chains, wherein communicating data over the single one of the multiple WLAN radio chains includes transmitting and receiving the voice session data, and transmitting or receiving the non-voice session data.

12. The computing device of claim 11, wherein the computing device had been communicating data over more than one of the multiple WLAN radio chains immediately prior to the computing device switching to using the single one of the multiple WLAN radio chains.

13. The computing device of claim 11, wherein the computing device is configured to communicate data over the WWAN radio chain, including the voice session data from the full-duplex voice communication session, as a result of the computing device having determined that the level of non-voice session data that is queued for transmission or receipt by the computing device does not fall beneath the threshold level of data.

14. The computing device of claim 11, further comprising:

determining, by the computing device and while the computing device is communicating data over the single one of the multiple WLAN radio chains, that a quality of WLAN communications drops below a threshold quality level; and switching, by the computing device as a result of the computing device having determined that the quality of WLAN communications dropped below the threshold quality level, from using the single one of the multiple WLAN radio chains to using the WWAN radio chain, and communicating data over the WWAN radio chain, including voice session data from the full-duplex voice communication session.

15. The computing device of claim 11, further comprising:

determining, by the computing device and while the computing device is communicating data over the single one of the multiple WLAN radio chains, that the level of non-voice session data that is queued for transmission or receipt by the computing device is greater than a second threshold level of data, wherein the second threshold level of data is greater than the first threshold level of data; and switching, by the computing device as a result of the computing device having determined that the level of non-voice session data that is queued for transmission or receipt by the computing device is greater than the second threshold level of data, from using the single one of the multiple WLAN radio chains to using the WWAN radio chain, and communicating data over the WWAN radio chain, including voice session data from the full-duplex voice communication session.

16. The computing device of claim 11, wherein the computing device communicating data over the single one of the multiple WLAN radio chains, including the voice session data from the full-duplex voice communication session, is further in distinction to the computing device communicating data over the WWAN radio chain, such that data is being transmitted over only the single one of the multiple WLAN radio chains.

17. The computing device of claim 11, wherein:

the single one of the multiple WLAN radio chains includes a first amplifier and a first antenna;

a second one of the multiple WLAN radio chains includes a second amplifier and a second antenna;

the WWAN radio chain includes a third amplifier and a third antenna; and the first antenna, the second antenna, and the third antenna are physically separated from each another.

18. The computing device of claim 11, wherein:

the WLAN technology comprises Wi-Fi technology; and the WWAN technology comprises cellular technology that uses one or more of Global System for Mobiles (GSM), Code Division Multiple Access (CDMA), or Long-Term Evolution (LTE).

19. The computing device of claim 11, wherein:

communications using one or more of the WLAN radio chains communicate using center channel frequencies between 2 GHz and 30 GHz; and communications using the WWAN radio chain communicate using center channel frequencies between 300 MHz and 2000 MHz.

20. The computing device of claim 11, wherein the level of non-voice session data that is queued for transmission or receipt comprises a trend level at which non-voice session data that is queued for transmission or receipt is increasing or decreasing.

21. The computer-implemented method of claim 5, wherein the computing device had been communicating data over more than one of the multiple WLAN radio chains immediately prior to the computing device switching to using the single one of the multiple WLAN radio chains.

22. The computer-implemented method of claim 5, wherein the computing device had been communicating data over the WWAN radio chain immediately prior to the computing device switching to using the single one of the multiple WLAN radio chains.

* * * * *